(12) United States Patent
Mascavage, III et al.

(10) Patent No.: US 7,596,529 B2
(45) Date of Patent: Sep. 29, 2009

(54) BUTTONS FOR PERSON TO PERSON PAYMENTS

(75) Inventors: John Joseph Mascavage, III, San Mateo, CA (US); Robert Edwin Dravenstott, San Mateo, CA (US); Joris Vega, San Francisco, CA (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 1290 days.

(21) Appl. No.: 10/076,036

(22) Filed: Feb. 13, 2002

(65) Prior Publication Data

US 2003/0154164 A1    Aug. 14, 2003

(51) Int. Cl.
*G06Q 40/00* (2006.01)
(52) U.S. Cl. ........................................ 705/39
(58) Field of Classification Search ............... 705/39, 705/35
See application file for complete search history.

(56) References Cited

U.S. PATENT DOCUMENTS

| | | | |
|---|---|---|---|
| 3,599,151 A | 8/1971 | Harr | |
| 3,783,755 A | 1/1974 | Lagin | |
| 3,833,395 A | 9/1974 | Gosnell | |
| 4,032,931 A | 6/1977 | Haker | |
| 4,321,672 A | 3/1982 | Braun et al. | |
| 4,454,414 A | 6/1984 | Benton | |
| 4,562,340 A | 12/1985 | Tateisi et al. | |
| 4,562,341 A | 12/1985 | Ohmae et al. | |
| 4,630,200 A | 12/1986 | Ohmae et al. | |
| 4,678,895 A | 7/1987 | Tateisi et al. | |
| 4,722,554 A | 2/1988 | Pettit | |
| 4,812,628 A | 3/1989 | Boston et al. | |
| 4,902,881 A | 2/1990 | Janku | |
| 4,961,142 A | 10/1990 | Elliott et al. | |
| 4,972,318 A | 11/1990 | Brown et al. | |
| 5,021,967 A | 6/1991 | Smith | |

(Continued)

FOREIGN PATENT DOCUMENTS

EP    0 481 135 A1    4/1992

(Continued)

OTHER PUBLICATIONS www.tomsown.com/htmlsnippet.html, May 23, 2000.*

(Continued)

*Primary Examiner*—Kambiz Abdi
*Assistant Examiner*—Lindsay M. Maguire
(74) *Attorney, Agent, or Firm*—Townsend and Townsend and Crew LLP

(57) ABSTRACT

A process for facilitating payment between a buyer and a seller with an online money transfer performed over a wide area network is disclosed. In one step, login information relevant to a vending site is received. The login information is associated with the seller. Listings at the vending site associated with the seller are automatically determined. A number of snippets of HTML code are generated for the listings, wherein each snippet includes a link. One of the number of snippets is automatically inserted into each of the listings. Activation of the link points a web browser to a payment enabler that can transfer money from the buyer to the seller.

26 Claims, 7 Drawing Sheets

U.S. PATENT DOCUMENTS

| | | | |
|---|---|---|---|
| 5,053,607 A | 10/1991 | Carlson et al. | |
| 5,119,293 A | 6/1992 | Hammond | |
| 5,175,682 A | 12/1992 | Higashiyama et al. | |
| 5,220,500 A * | 6/1993 | Baird et al. | 705/36 R |
| 5,220,501 A | 6/1993 | Lawlor et al. | |
| 5,283,829 A | 2/1994 | Anderson | |
| 5,326,960 A | 7/1994 | Tannenbaum | |
| 5,350,906 A | 9/1994 | Brody et al. | |
| 5,367,452 A | 11/1994 | Gallery et al. | |
| 5,383,113 A * | 1/1995 | Kight et al. | 705/40 |
| 5,408,077 A | 4/1995 | Campo et al. | |
| 5,426,594 A | 6/1995 | Wright et al. | |
| 5,448,043 A | 9/1995 | Nakano et al. | |
| 5,461,217 A | 10/1995 | Claus | |
| 5,464,971 A | 11/1995 | Sutcliffe et al. | |
| 5,465,206 A | 11/1995 | Hilt et al. | |
| 5,477,037 A | 12/1995 | Berger | |
| 5,477,038 A | 12/1995 | Levine et al. | |
| 5,484,988 A | 1/1996 | Hills et al. | |
| 5,491,325 A | 2/1996 | Huang et al. | |
| 5,504,677 A | 4/1996 | Pollin | |
| 5,510,979 A | 4/1996 | Moderi et al. | |
| 5,513,117 A | 4/1996 | Small | |
| 5,524,073 A | 6/1996 | Stambler | |
| 5,555,496 A | 9/1996 | Tackbary et al. | |
| 5,557,518 A * | 9/1996 | Rosen | 705/69 |
| 5,570,465 A | 10/1996 | Tsakanikas | |
| 5,577,109 A | 11/1996 | Stimson et al. | |
| 5,590,197 A * | 12/1996 | Chen et al. | 705/65 |
| 5,604,802 A | 2/1997 | Holloway | |
| 5,622,388 A | 4/1997 | Alcordo | |
| 5,629,982 A | 5/1997 | Micali | |
| 5,638,283 A | 6/1997 | Herbert | |
| 5,649,117 A | 7/1997 | Landry | |
| 5,650,604 A | 7/1997 | Marcous et al. | |
| 5,657,201 A | 8/1997 | Kochis | |
| 5,677,955 A | 10/1997 | Doggett et al. | |
| 5,679,940 A | 10/1997 | Templeton et al. | |
| 5,699,528 A | 12/1997 | Hogan | |
| 5,710,887 A * | 1/1998 | Chelliah et al. | 705/26 |
| 5,717,868 A | 2/1998 | James | |
| 5,721,768 A | 2/1998 | Stimson et al. | |
| 5,732,136 A | 3/1998 | Murphree et al. | |
| 5,732,400 A | 3/1998 | Mandler et al. | |
| 5,745,886 A | 4/1998 | Rosen | |
| 5,757,917 A | 5/1998 | Rose et al. | |
| 5,764,888 A | 6/1998 | Bolan et al. | |
| 5,774,879 A | 6/1998 | Custy et al. | |
| 5,778,067 A | 7/1998 | Jones et al. | |
| 5,779,379 A | 7/1998 | Mason et al. | |
| 5,783,808 A | 7/1998 | Josephson | |
| 5,787,403 A | 7/1998 | Randle | |
| 5,794,207 A | 8/1998 | Walker et al. | |
| 5,815,657 A | 9/1998 | Williams et al. | |
| 5,825,617 A | 10/1998 | Kochis et al. | |
| 5,826,241 A | 10/1998 | Stein et al. | |
| 5,828,875 A | 10/1998 | Halvarsson et al. | |
| 5,832,463 A | 11/1998 | Funk | |
| 5,870,718 A | 2/1999 | Spector | |
| 5,875,435 A | 2/1999 | Brown | |
| 5,878,211 A | 3/1999 | Delagrange et al. | |
| 5,880,446 A | 3/1999 | Mori et al. | |
| 5,893,080 A | 4/1999 | McGurl et al. | |
| 5,896,298 A | 4/1999 | Richter | |
| 5,897,625 A | 4/1999 | Gustin et al. | |
| 5,897,989 A | 4/1999 | Beecham | |
| 5,898,154 A | 4/1999 | Rosen | |
| 5,899,980 A | 5/1999 | Wilf et al. | |
| 5,899,982 A | 5/1999 | Randle | |
| 5,902,983 A | 5/1999 | Crevelt et al. | |
| 5,903,881 A | 5/1999 | Schrader et al. | |
| 5,909,492 A | 6/1999 | Payne et al. | |
| 5,909,673 A | 6/1999 | Gregory | |
| 5,910,988 A | 6/1999 | Ballard | |
| 5,913,202 A | 6/1999 | Motoyama | |
| 5,915,023 A | 6/1999 | Bernstein | |
| 5,920,629 A | 7/1999 | Rosen | |
| 5,920,847 A | 7/1999 | Kolling et al. | |
| 5,920,848 A | 7/1999 | Schutzer et al. | |
| 5,937,396 A | 8/1999 | Konya | |
| 5,949,044 A | 9/1999 | Walker et al. | |
| 5,952,639 A | 9/1999 | Ohki et al. | |
| 5,953,709 A | 9/1999 | Gilbert et al. | |
| 5,953,710 A | 9/1999 | Fleming | |
| 5,960,412 A | 9/1999 | Tackbary et al. | |
| 5,963,647 A | 10/1999 | Downing et al. | |
| 5,974,146 A | 10/1999 | Randle et al. | |
| 5,974,194 A | 10/1999 | Hirani et al. | |
| RE36,365 E | 11/1999 | Levine et al. | |
| 5,987,426 A | 11/1999 | Goodwin, III | |
| 5,993,047 A | 11/1999 | Novogrod et al. | |
| 5,999,624 A | 12/1999 | Hopkins | |
| 6,003,763 A | 12/1999 | Gallagher et al. | |
| 6,011,833 A | 1/2000 | West | |
| 6,012,045 A | 1/2000 | Barzilai et al. | |
| 6,012,048 A | 1/2000 | Gustin et al. | |
| 6,015,087 A | 1/2000 | Seifert et al. | |
| 6,027,216 A | 2/2000 | Guyton | |
| 6,029,150 A | 2/2000 | Kravitz | |
| 6,030,000 A | 2/2000 | Diamond | |
| 6,032,133 A | 2/2000 | Hilt et al. | |
| 6,032,137 A | 2/2000 | Ballard | |
| 6,035,285 A | 3/2000 | Schlect et al. | |
| 6,035,406 A | 3/2000 | Moussa et al. | |
| 6,039,245 A | 3/2000 | Symonds et al. | |
| 6,039,250 A | 3/2000 | Ito et al. | |
| 6,044,360 A | 3/2000 | Picciallo | |
| 6,044,362 A | 3/2000 | Neely | |
| 6,044,363 A | 3/2000 | Mori et al. | |
| 6,045,039 A | 4/2000 | Stinson et al. | |
| 6,058,417 A * | 5/2000 | Hess et al. | 709/219 |
| 6,064,990 A | 5/2000 | Goldsmith | |
| 6,070,150 A * | 5/2000 | Remington et al. | 705/34 |
| 6,070,156 A | 5/2000 | Hartsell et al. | |
| 6,070,798 A | 6/2000 | Nethery | |
| 6,078,907 A | 6/2000 | Lamm | |
| 6,081,790 A | 6/2000 | Rosen | |
| 6,088,683 A | 7/2000 | Jalili | |
| 6,088,684 A | 7/2000 | Custy et al. | |
| 6,097,834 A | 8/2000 | Krouse et al. | |
| 6,098,053 A | 8/2000 | Slater | |
| 6,106,020 A | 8/2000 | Leef et al. | |
| 6,119,106 A | 9/2000 | Mersky et al. | |
| 6,119,931 A | 9/2000 | Novogrod | |
| 6,122,625 A | 9/2000 | Rosen | |
| 6,128,603 A | 10/2000 | Dent et al. | |
| 6,134,561 A | 10/2000 | Brandien et al. | |
| 6,145,738 A | 11/2000 | Stinson et al. | |
| 6,148,377 A | 11/2000 | Carter et al. | |
| 6,149,056 A | 11/2000 | Stinson et al. | |
| 6,164,528 A | 12/2000 | Hills et al. | |
| 6,167,386 A | 12/2000 | Brown | |
| 6,175,823 B1 | 1/2001 | Van Dusen | |
| 6,189,787 B1 | 2/2001 | Dorf | |
| 6,193,152 B1 | 2/2001 | Fernando et al. | |
| 6,199,761 B1 | 3/2001 | Drexler | |
| 6,202,054 B1 | 3/2001 | Lawlor et al. | |
| 6,206,283 B1 | 3/2001 | Bansal et al. | |
| RE37,122 E | 4/2001 | Levine et al. | |
| 6,223,168 B1 | 4/2001 | McGurl et al. | |
| 6,246,996 B1 | 6/2001 | Stein et al. | |
| 6,247,047 B1 | 6/2001 | Wolff | |
| 6,260,024 B1 | 7/2001 | Shkedy | |
| 6,263,446 B1 | 7/2001 | Kausik et al. | |

| | | |
|---|---|---|
| 6,269,369 B1 | 7/2001 | Robertson |
| 6,275,829 B1 | 8/2001 | Angiulo et al. |
| 6,286,756 B1 | 9/2001 | Stinson et al. |
| 6,289,322 B1 | 9/2001 | Kitchen et al. |
| 6,292,789 B1 | 9/2001 | Schutzer |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,984 B1 | 11/2001 | McCall et al. |
| 6,327,570 B1 | 12/2001 | Stevens |
| 6,327,575 B1 | 12/2001 | Katz |
| 6,343,279 B1 | 1/2002 | Bissonette et al. |
| 6,347,305 B1 | 2/2002 | Watkins |
| 6,351,739 B1 | 2/2002 | Egendorf |
| 6,360,254 B1 | 3/2002 | Linden et al. |
| 6,367,693 B1 | 4/2002 | Novogrod |
| 6,394,343 B1 | 5/2002 | Berg et al. |
| 6,408,284 B1 | 6/2002 | Hilt et al. |
| 6,411,942 B1 | 6/2002 | Fujimoto |
| 6,415,271 B1 | 7/2002 | Turk et al. |
| 6,438,586 B1 | 8/2002 | Hass |
| 6,449,599 B1 | 9/2002 | Payne et al. |
| 6,453,300 B2 | 9/2002 | Simpson |
| 6,473,500 B1 | 10/2002 | Risafi et al. |
| 6,484,936 B1 | 11/2002 | Nicoll et al. |
| 6,488,203 B1 | 12/2002 | Stoutenburg et al. |
| 6,502,747 B1 | 1/2003 | Stoutenburg et al. |
| 6,510,453 B1 | 1/2003 | Apfel et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,609,113 B1 | 8/2003 | O'Leary et al. |
| RE38,255 E | 9/2003 | Levine et al. |
| 6,618,705 B1 | 9/2003 | Wang et al. |
| 6,736,314 B2 | 5/2004 | Cooper et al. |
| 6,761,309 B2 | 7/2004 | Stoutenburg et al. |
| 6,761,311 B1 | 7/2004 | Algiene et al. |
| 6,814,282 B2 | 11/2004 | Seifert et al. |
| 6,827,260 B2 | 12/2004 | Stoutenburg et al. |
| 6,829,588 B1 | 12/2004 | Stoutenburg et al. |
| 6,847,947 B1 | 1/2005 | Kambour et al. |
| 6,886,742 B2 | 5/2005 | Stoutenburg et al. |
| 6,908,031 B2 | 6/2005 | Seifert et al. |
| 6,922,673 B2 | 7/2005 | Karas et al. |
| 7,120,608 B1 * | 10/2006 | Gallagher et al. ............ 705/68 |
| 2001/0042785 A1 | 11/2001 | Walker et al. |
| 2001/0051876 A1 | 12/2001 | Seigel et al. |
| 2001/0054003 A1 | 12/2001 | Chien et al. |
| 2002/0023055 A1 | 2/2002 | Antognini et al. |
| 2002/0046106 A1 | 4/2002 | Ishibashi et al. |
| 2002/0062285 A1 | 5/2002 | Amann |
| 2002/0087462 A1 | 7/2002 | Stoutenburg et al. |
| 2002/0087463 A1 | 7/2002 | Fitzgerald et al. |
| 2002/0087467 A1 | 7/2002 | Muscavage et al. |
| 2002/0104026 A1 | 8/2002 | Barra et al. |
| 2002/0111908 A1 | 8/2002 | Milberger et al. |
| 2002/0152160 A1 * | 10/2002 | Allen-Rouman et al. ...... 705/39 |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |
| 2003/0024979 A1 | 2/2003 | Hansen et al. |
| 2003/0028491 A1 | 2/2003 | Cooper |
| 2003/0055780 A1 | 3/2003 | Hansen et al. |
| 2003/0069856 A1 | 4/2003 | Seifert |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2004/0015438 A1 | 1/2004 | Compiano |
| 2004/0024701 A1 | 2/2004 | Hansen et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0088248 A1 | 5/2004 | Cutler |
| 2004/0088261 A1 | 5/2004 | Moore et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0117302 A1 | 6/2004 | Weichert et al. |
| 2004/0138947 A1 | 7/2004 | McGee et al. |
| 2004/0139008 A1 | 7/2004 | Mascavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0167860 A1 | 8/2004 | Baxter et al. |
| 2004/0193897 A1 | 9/2004 | Van Volkenburgh |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211831 A1 | 10/2004 | Stoutenburg et al. |
| 2004/0254833 A1 | 12/2004 | Algiene et al. |
| 2005/0017607 A1 | 1/2005 | Weinberger |
| 2005/0167481 A1 | 8/2005 | Hansen et al. |
| 2005/0180550 A1 | 8/2005 | McGee et al. |
| 2005/0187929 A1 | 8/2005 | Staggs |
| 2005/0209958 A1 | 9/2005 | Michelsen |
| 2005/0209961 A1 | 9/2005 | Michelsen |

FOREIGN PATENT DOCUMENTS

| | | |
|---|---|---|
| EP | 0 745 961 A2 | 4/1996 |
| EP | 0 745 961 A3 | 7/1998 |
| EP | 0 949 596 A2 | 10/1999 |
| EP | 1 077 436 A2 | 2/2001 |
| FR | 2728983 A1 | 7/1996 |
| WO | WO 96/26508 A1 | 8/1996 |
| WO | WO 98/49644 A1 | 11/1998 |
| WO | WO 98/50875 A2 | 11/1998 |
| WO | WO 99/22291 A1 | 5/1999 |
| WO | WO 99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | WO 01/39093 A1 | 5/2001 |
| WO | WO 02/05195 A1 | 1/2002 |

OTHER PUBLICATIONS

Amerinet, Inc., "Debit-It!—The Best Idea In Payment Systems Since the Credit Card", downloaded from website http://www.debit-it.com./ on Feb. 7, 2000, 8 pages.

Business Wire, "*E-Commerce, Email and E-greeting Cards Combine in New Web Site Designed by Interactive Bureau*", Sep. 14, 1999 (abstract), [online] [retrieved on May 1, 2002], retrieved from Proquest Database, 2 pages.

Confinity, Inc., PayPal.com, How PayPal.com Works, downloaded from website http://www.paypal.com on Feb. 7, 2000, 7 pages.

Dotbank, *The Way to Send and Receive Money on the Internet*, downloaded from website http://www.dotbank.com, Feb. 7, 2000, 6 pages.

http://www.vfi-finance.com/tranz330.htm, Tranz 330 Fast, Low-Cost Transaction Automation At The Point Of Service, VeriFone Finance, Jan. 1999, pp. 1-3, especially pp. 1-2.

Idealab Company, PayMe.com, downloaded from website http://ssl.idealab.com on Feb. 16, 2000, 7 pages.

Intell-A-Check Corp.: "Intell-A-Check!—The Way to get Paid", Intell-A-Check product overview, retrieved from http://www.icheck.com/ on Feb. 7, 2000, 7 pages.

Karpinski, R. "Web Mechants Try Debit Cards and Gift Certificates to Spur Sales" InternetWeek, Oct. 11, 1999, 2 pages.

Lawton, George; "Biometrics: A New Era in Security"; 1998, Computer, vol. 31, No. 8, pp. 16-18.

New commercial services from Western Union allow businesses to directly transfer money internationally; User companies can now send or receive money at their own offices through on-line connection to world's largest international money transfer network. Business Wire. Oct. 16, 1995, p. 1.

Russo, R. "Omaha's Giftpoint.com Draws $5 Million Investment", Omaha World, Dec. 14, 1999, 2 pages.

Stockel, Anna; "Securing Data and Financial Transactions"; 1995, Institute of Electrical and Electronics Engineers 29th Annual Conference, pp. 397-401.

PR Newswire, "GiftSpot.com Simplifies Gift-Giving on the Internet," Oct. 20, 1999 (abstract), [online] [retrieved on May 1, 2002], retrieved from Proquest Database, 5 pages.

TeleCheck International, Inc.: "Making Checks Our Responsibility", retrieved from http://www.telecheck.com/home/home.html on Feb. 7, 2000, 8 pages.

Transpoint, "The Way to Pay Online", downloaded from website http://www.transpoint.com/ on Feb. 10, 2000, 12 pages.

Walker, L. "Click a Card", The Washington Post, Dec. 16, 1999, 3 pages.

x.com, Do More with Your Money, downloaded from website http://www.x.com., Feb. 7, 2000, 5 pages.

Press Release: "Western Union Announces ATM Card Payout for Money Transfer Transactions"; 2001, URL: http://news.firstdata.com/media/ReleaseDetail.cfm?ReleaseID=849995>.

Levin, Gary; "Western Union not fading into sunset; new services are added at telegrams drop"; 1992, 2 pages.

"Quick Collect"; Western Union Training Guide; 2004, 10 pages.

"Purchasing American Airlines Tickets Just Got Easier"; 2005, 4 pages.

"Lan Airline Alliance Carriers and Western Union Offer Travelers Additional Payment Options"; 2005, 3 pages.

Quick Collect: Government/Child Support Agency Name, Training Guide; 2004, 7 pages.

"Why Send Your Customers Across Town When You Can Send Them Next Door?"; 2005, 1 page.

"If you're not getting your payment with Quick Collect, chances are you're not getting it"; 2001, 2 pages.

"Western Union: Ford Credit Phone Pay-How does it work?", 2001, 1 page.

Western Union Quick Collect: The Fastest way to collect good funds; 1999, 11 pages.

"Announcing Quick Collect Online"; 2002, Western Union's Professional Collector, 3 pages.

"When you're helping a customer make a crucial payment there's no room for guesswork"; 2002, Western Union's Professional Collector, 3 pages.

"Western Union Quick Collect: The most agents, the most locations, the most experienced"; 2002, 2 pages.

"It takes a certain person to maka a good collector. But it takes a good manager to make a champion"; 2001, Western Union's Professional Collector, 3 pages.

"Nationwide Credit Collectors Act Globally", 2001, Western Union's Professional Collector, 3 pages.

"Guess What? The check's not in the mail"; 2001, Western Union's Professional Collector, 3 pages.

"Quick Cash and Quick Collect: Western Union's money-movers"; 1990, *Newsbriefs*, vol. 2, No, 1, 3 pages.

"Company Profile: The Western Union Convenience Pay Service"; 2004, 4 pages.

"You're sending more than a payment: You're sending peace of mind"; 2004, 3 pages.

"Rhode Island becomes first state to accept child support payments at Western Union: More than 50 Western Union Convenience Pay Agent Locations Offer New Level of Convenience to Rhode Island Residents Who Pay Child Support—"; 2002, 3 pages.

"Rhode Island becomes first state to accept child support payments at Western Union: Government Payment Leader govONE Solutions Adds Walk-in to Full Suite of Payment Options"; 2002, 3 pages.

"State of Hawaii to Accept Child Support Payments at Western Union"; 2004, 2 pages.

"Annual Report of the President of the Western Union Telegraph Company"; 1873, pp. 8-11.

"First located example of a money transfer"; Aug. 25, 1873, 1 page.

"Annual Report of the President of the Western Union Telegraph Company"; 1874, pp. 8-11.

"The Western Union Telegraph Company: Rules for Money Transfer Service"; 1908, pp. 3-25.

"The Western Union Telegraph Company: Delivery Department Instructions"; 1926, Commercial Bulletin No. 9-A, 2 pages.

"The Western Union Telegraph Company:Instructions for Receiving Clerks"; 1929, Commercial Bulletin No. 37-A, 2 pages.

"Annual Report of the Western Union Telegraph Company"; 1935, 2 pages.

"Dots and Dashes"; 1935, vol. 11, No. 9, 4 pages.

"Annual Report of the Western Union Telegraph Company"; 1940, pp. 9 and 22.

"Annual Report of the Western Union Telegraph Company"; 1947, 2 pages.

"Annual Report of the Western Union Telegraph Company"; 1949, 2 pages.

"Annual Report of the Western Union Telegraph Company"; 1951, 2 pages.

"Annual Report of the Western Union Telegraph Company"; 1953, 2 pages.

"Annual Report of the Western Union Telegraph Company"; 1954, 3 pages.

"Annual Report of the Western Union Telegraph Company"; 1973, 5 pages.

"Annual Report of the Western Union Telegraph Company"; 1974, 2 pages.

"Annual Report of the Western Union Telegraph Company"; 1978, 2 pages.

"Annual Report of the Western Union Telegraph Company"; 1981, 2 pages.

"Amex Money Order Dispenser"; 1990, The Nilson Report, 1 page.

"Western Union's Wound-Be Rival"; 1990, American Banker, 1 page.

"American Express in New Ad Drive"; 1990, American Banker, 1 page.

"American Express Unit Introduces State-Of-The-Art Automated Money Order Dispenser"; 1990, Tri-State Food News, 1 page.

"Annual Report of the Western Union Corporation"; 1990, 4 pages.

"Collection by Money Transfer: MoneyGram Service Removes Time-Consuming Steps to Commercial Collections"; 1990, Collector, p. 36.

"Amex tests Moneygram"; 1990, Adnews, 1 page.

"Amex aims expansion strategy at local currency exchanges"; 1990, Crain's Chicago Business, 1 page.

"Sending Cash in a Flash"; 1990, Travel & Leisure, p. 42.

"... And a Nine-Second Money Order Dispenser"; 1991, Post-News, vol. 17, No. 1, 1 page.

"Money-wire giants battle for business: Currency exhcanges wooed"; 1991, Chicago Sun Times, 2 pages.

"Sending Cash in a Flash: There are more ways to do it than you might think"; 1991, 2 pages.
"Loved one stranded? Send Cash"; 1991, Akron Beacon Journal, 2 pages.
"Common Values: Uncommon Opportunities", 1995, First Data Corporation Annual Report, 2 pages.
"Behind the Scenes of Life"; 1996, First Data Corporation Annual Report, 3 pages.
"First Data InfoSource Offers Database Analysis with DecisionScope"; 1996, First Data Corporation News Release, 2 pages.
First Data and Netscape Offering Internet Payment Processing Service; 1996, First Data Corporation News Release, 3 pages.
"CES/NaBANCO Introduces Stored Value Card Technology: Blockbuster Video is First Merchant Partner"; 1996, First Data Corporation News Release, 3 pages.
"First Data to Offer Card Profitability Software from HNC: Distribution Agreement Poised to Repeat Falcon Success";1996, HNC Software, Inc. News Releases, 3 pages.
"VIPS Introduces MCSource to Managed Healthcare Industry"; 1996, VIPS Healtcare Information Systems News Release, 2 pages.
"Leading Provider of Transaction Card Processing Selects Connect Oneserver Software as a Solution for Advanced Internet Merchant Services: First Data Chooses OneServer as an Application to Deliver the Internet Banks and Merchants"; 1996, press Release, 4 pages.
"Netscape Announces Netscape Livepayment to Facilitate Internet Commerce"; 1996, Netscape News Release, 4 pages.
"Strean, LitleNet, BBN, and KPMG Announce Industry-Wide Initiative to Enable Wide-Scale Software Electronic Commerce"; 1996, News Release, 6 pages.
"First Data and Netscape Announce Program to Help Businesses Establish Payment-Enabled Web Sites"; 1996, First Data Corporation News Release, 5 pages.
"FDR to Offer HNC Software's Real-Time Fraud Detection: New distribution Agreement to Benefit Card Banks"; 1996, First Data Resources News Release, 3 pages.
"First Data Aligns with CyberCash to Offer New Electronic Coin Service"; 1996, First Data Corporation News Release, 3 pages.
"First Data, First USA Paymentech, GE Capital Invest in First Virtual Holdings"; 1996, First Virtual Holdings Corporation News Release, 3 pages.
"Annual Report of First Data Corporation"; 1998, 3 pages.
"Annual Report of First Data Corporation"; 1999, 2 pages.
"American Express Introduces Automated Money Order Dispenser"; 1991, Professional Check Casher, 1 page.
"American Express Money Orders, Travelers Cheques Now on Sale"; 1936, Dots and Dashes, 2 pages.
"Get your Collect Card", 1939, Dots and Dashes, 2 pages.
"NTS Completes Merger with EDS Fleet Services; New First Data Unit Sets Sights on New Markets"; 1996, NTS Press Release, 3 pages.
Transfers require ID made by telegraph; 1895, Tariff Book, 4 pages.
"MoneyZap.com Greeting Card Process Flow"; 2000, 2 pages.
"Aeromexico and Western Union Partner to Offer a Cash Payment Option for Booking Airline Tickets"; 2004, Press Release, 2 pages.
"Western Union and Continental Airlines Introduce New Quick and Easy Cash Payment Option When Booking Flights"; 2004, Press Release, 4 pages.
"Purchasing American Airlines Tickets Just Go Easier"; 2004, Press Release, 4 pages.
"LAN Airline Alliance Carriers and Western Union offer Travellers Additional Payment Options"; 2005, Press Release, 3 pages.
"Western Union Financial Services, Inc.: Benefits Quick Cash Agreement and Disclosure Statement"; 1998, 2 pages.
"Western Union Financial Services, Inc.: Cash Card Agreement and Disclosure Statement"; 1998, 2 pages.
"Introducing the Western Union Cash Card Program"; 1998, 2 pages.
"Western Union Creates Phone Card with BLT Technologies"; 1997, PR Newswire Association, 2 pages.
"AT&T Wireless to Offer Western Union SwiftPay as Replenishment Option for AT&T Free2Go Wireless Prepaid Customers"; 2001, PR Newswire Association, 2 pages.

"New Western Union SwiftPay Service Contiunues Expansion of Consumer-to-Business Payment Options"; 1999, PR Newswire Association, 2 pages.
"Western Union SwiftPay Selected by Sheakley Uniservice to Complete W-2 Reprint Transactions"; 2000, PR Newswire Association, 2 pages.
"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.
"Rhode Island becomes First State to Accept Child Support Payments at Western Union: Government Payment Leader govONE Solutions Adds Walk-in to Full Suite of Payment Options"; 2002, Press Release, 3 pages.
"SBC Communications Adds Western Union Locations for Walk-In Customer Bill Payments"; 2005, Press Release, 2 pages.
"Western Union Money Orders More Popular Than Ever": 1942, Dots and Dashes, vol. 18, No. 3, 2 pages.
"Refund of Money Transfers"; 1913, Journal of the Telegraph, 2 pages.
Western Union Credit Card; 1915, 4 pages.
"The Yellow Blank is Correct for every social need"; 1930, Western Union Booklet, 2 pages.
"Last of the Pony Express Riders Tells His Story"; 1932, Dots and Dashes, vol. 8, No. 10, 2 pages.
"Nation Receives Time Over Western Union Network"; 1931, Dots and Dashes, vol. 7, No. 5, 2 pages.
"Collect your delinquent accounts by Telegraph"; 1933, Form 1229-A, 1 page.
"Reynolds Arcade was Western Union Birthplace"; 1933, Dots and Dashes, vol. 9, No. 8, 2 pages.
"Messenger Work Full of Adventure, Excitement"; 1933, Dots and Dashes, vol. 9, No. 11, 2 pages.
Shopping Order service and gift service; 1934, Western Union Telegraph Company, Money Order Book, 6 pages.
Money Order by Phone; 1935, Fortune Magazine, 3 pages.
"The Yellow Blank: When, Why, How to Use It"; 1934, 5 pages.
Money Order with confirmation; 1948, 1 page.
"Western Union Products and Services: a brief description"; 1960, 22 pages.
Survey of services; 1960, pp. 2-31.
Western Union News Supplement: Automatic travelers checks using Western Union; 1975, 2 pages.
Western Union New Supplement: Money Orders delivery through Mailgram: 1975, 2 pages.
Remittance for order sent via Western Union; 1933, 2 pages.
Western Union Telegraph Company; 1933, Money Order Message.
Gift: Money Order for something you really want: 1933, 1 page.
Holiday Greeting by Western Union; 1933, 1 page.
Western Union Money Transfer, Form 72-A, 1933, 1 page.
Western Union Foreign Transfer Order, Form 72-A, 1933, 1 page.
Western Union Domestic Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Shopping Order by Western Union, 1933, 1 page.
Western Union Shopping Order, 1933, 2 pages.
bidpay.com: Whois search results; 2003, http://www.networksolutions.com/en_US/whois/results.jhtml;jsessionid+VZDZVYDD1J, 2 pages.
"billserv.com Launches bills.com, an internet Portal for Consumers to Pay All Bills Online at No Cost"; 2000, Business Wire, 2 pages.
First Data Acquires PaySys International; 2001, Press Release, 2 pages.
PayPal.com Case Study; http://fox.rollins.edu/~slackman/PayPay.htm, 2003, 7 pages.
PayPal-News; http://www.ndrys.com/paypal.html, 2003, 3 pages.
Hoffman, Karen Epper; "PayPal Still Running Free"; 2003, Bank Technology News, 3 pages.
Latour, Almar; "PayPal Electronic Plan May be on the Money in Years to Come"; 1999, The Wall Street Journal, 2 pages.

Plotkin, Hal; "Beam Me Up Some Cash"; 1999, Silicon Valley Insider, 3 pages.
Boneh, Dan: "Beaming Money by Email is Web's Next Killer App"; 1999, PR Newswire, 4 pages.
Steiner, Ina: "BidPay.com Offers Click and Pay Service for buyers"; 2000, Auction Bytes, 4 pages
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Steiner, Ina: "Accepting Credit Cards When You Sell Items: ProPay and Billpoint Payment Services"; 2000 Auction Bytes, 4 pages.
Wermer, Sandra; "A million credit card transactions in five hours"; 1997, Primeur, 2 pages.
"PaySys signs up four Asian distributors"; 1997 Orlando Business Journal, 3 pages.
State of New York Banking Department: Staff Letters and Memoranda; 2000, http://www.banking.state.ny.us/lo000718.htm, 2 pages.
Wijnen, Rene; You've Got Money?; 2000, Bank Technology News, vol. 13, No. 6, 4 pages.
Author unknown "Online Payment Services" www.auctionbytes.com/cab/pages/payment, compiled Nov. 2002, 3 pages.
Author Unknown "PayPal News", www.andrys.com/paypal.html, published prior to 2003, 3 pages.
Author Unknown " PayPal.com Case Study" http://fox.rollins.edu/~slackman/paypal.htm, 2001, 6 pages.
Boneh, Dan "Beaming Money by Email is Web's Next killer App", PR Newswire, Nov. 16, 1999, pp. 1-4.
Business Editors and High-Tech Writers "billserv.com Launches bills.com, an Internet Portal for Consumers to Pay Bills Online at No Cost" Business Wire, Feb. 22, 2000, pp. 1-2, New York.
Confinity, Inc. "PayPal for the Palm", www.handheldnew.com/file.asp?ObjectID=5401, published prior to Oct. 2003, 2 pages.
Epper Hoffman, Karen "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.
Latour, Almar "PayPal Electronic Plan May be On the Money in Years to Come", The Wall Street Journal Interactive Edition, Nov. 15, 1999, downloaded from www.paypal.com/html/wsj.html, 2 pages.
Plotkin, Hal "Beam Me Up Some Cash" Silicon Valley Insider, Sep. 8, 1999, www.halplotkin.com/cnbcs029.htm, 3 pages.
Steiner, Ina "PayPal Online Payment Service- Another Way to Pay for Auction Items" www.auctionbytes.com, Feb. 20, 2000, 4 pages.
Wijnen, Rene "You've Got Money!", Bank Technology News, Jun. 2000, pp. 1-4, vol. 13, Issue 6, New York.

* cited by examiner

BUTTONS FOR PERSON TO PERSON PAYMENTS

BACKGROUND OF THE INVENTION

The invention relates generally to person-to-person money transfers, and more particularly facilitating money transfers related to listings at vending sites.

One party may wish to transfer money to herself, a counter party, or vice versa, for any of a variety of reasons. For example, a payor may wish to give the money to the payee as a gift, or the payee may receive payment for an auction item sold to the payor. If the receiving party to the transfer is a merchant with a merchant credit card account, payment is received in the conventional way. Person-to-person payments apply to situations where the receiver of the payment does not have access to a merchant credit card account. For example, the payee in a person-to-person transaction may be a merchant of goods without the ability to accept credit card payments directly because a merchant credit card account is lacking.

Until recently for person-to-person payments, payors typically complete such payments via cash, check or money order because the payee does not have the ability to receive money electronically. Electronic payment methods are generally available to merchants, such as credit cards and bank account debits through electronic fund transactions, however, the payor may not have access to these methods for whatever reason. For example, these electronic payment methods for merchants may require purchasing hardware and/or software to support accepting payment.

Auction sites, such as eBay™, provide action services that often involve parties without access to merchant account for accepting payment. Today, these parties often rely upon online money transfer systems. Often a button is inserted into auctions that the payor may activate to link to the online money transfer system. This button may embed a user identifier for the payee that is passed to the online money transfer system when the payor activates the link. The user identifier is used in one example to inform the online money transfer system who referred the payor.

There are web sites that will auto-insert information into auction listings for various purposes. For example, an online money transfer system may insert buttons into all the auction listings for a particular user. The user provides the web site with a user name and password for the auction site and the web site finds all the active auction listings. A button is inserted into each active listing associated with the user.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention facilitates online money transfers between payors and payees that use vending sites. Types of vending sites include auction sites, classified advertising sites, and other on-line sites that facilitate person-to-person sales. When a party does not have access to a merchant account for accepting payment, they often rely upon a payment enabler to allow the money transfer in these person-to-person sales. In various embodiments, the process of interacting with the payment enabler is facilitated with a snippet that may have a link and a button graphic associated therewith. These snippets allow the payor or purchaser to reduce the information manually entered into the payment enabler. A metalink tool will add the snippet to all current and/or future listings at one or more vending sites.

Figure 1:
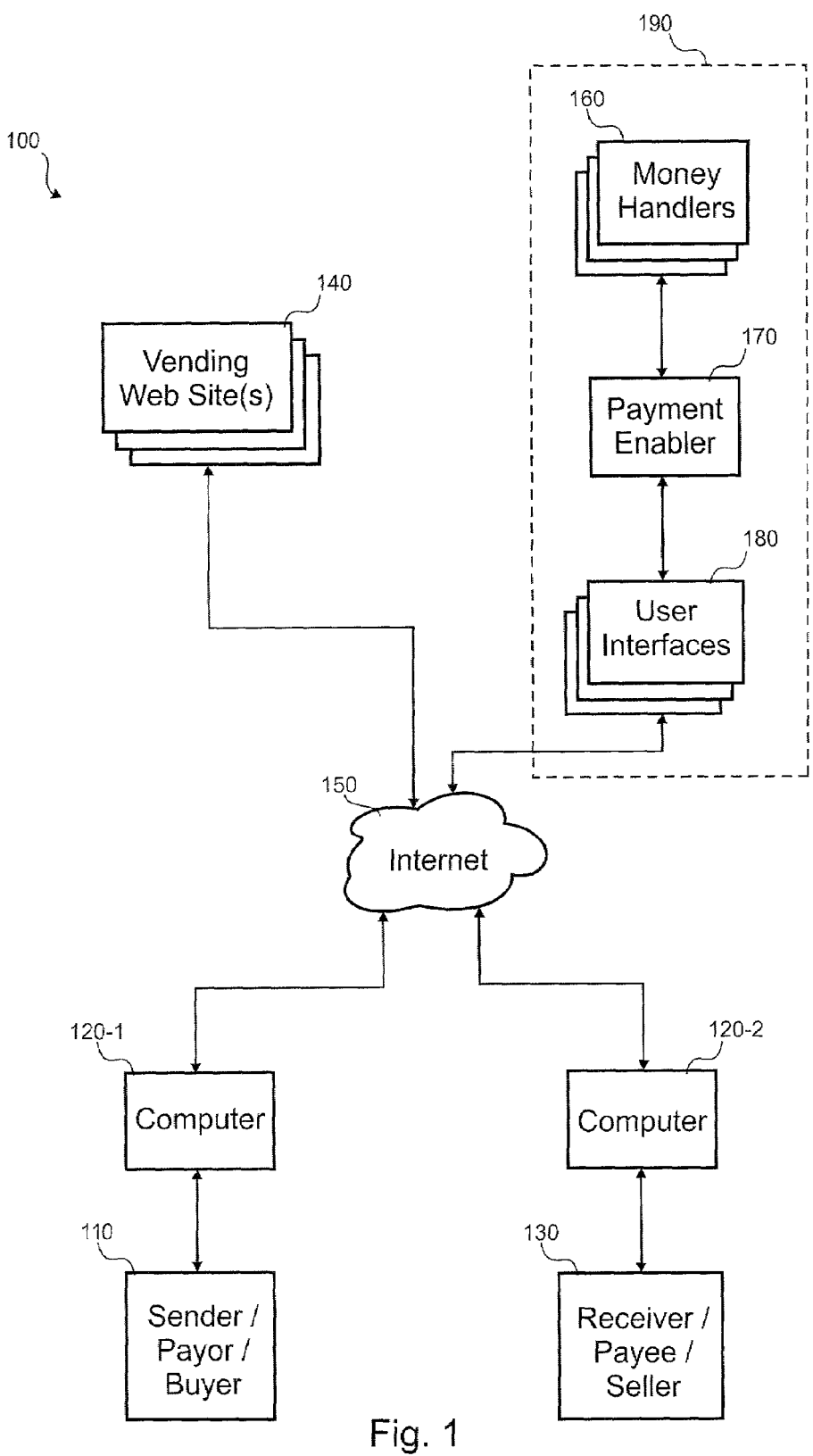
FIG. 1 is a block diagram of an embodiment of an online money transfer system that is interfaced to a payor and payee.

Referring first to FIG. 1, a block diagram of an embodiment of an on-line purchase system 100 is shown. Included in the system 100 are a vending web site 140, an online money transfer system 190, a sender 110, and a receiver 130. Respective computers 120 interface the sender 110 and receiver 130 to the Internet 150 or other wide area network such that they can interact with the vending site 140 and the money transfer system 190. Money handlers 160, a payment enabler 170 and user interfaces 180 make up the money transfer system 190.

The vending site 140 is a web site coupled to the Internet 150 and may include servers and other computers as is well known in the art. The sender 110 points their browser to the vending site 140 to choose a purchase listing associated with the receiver 130. These listings could be classified advertisements, electronic advertisements or auctions. As is the case with some auctions, a listing may not be paid for until a period specified in the auction has expired. Although this embodiment shows the vending site 140 being separate from the money transfer system 190, other embodiments could combine these into the same location or spread portions of either among any number of locations.

The transfer system 190 works in concert with the vending site 140 to help pay the selling party. It is noted that vending sites 140 do not typically support the insertion of buttons directly, but have certain features meant for manual manipulation that allow automation of the process by the payment enabler 170. When the purchaser wants to pay the selling party, the purchaser or payor interacts with the money transfer system 190 to get money sent to the selling party or payee. To initiate sending money, the payor may contact the payment enabler 170 directly, may click a button in the listing or may respond to a button or link in a money request. Money handlers 160 are used to paying money for the buyer 110 or payout money for the seller 130. The user interfaces 180 provide a variety of ways for the sender and receiver 110, 130 to interact with the transfer system 190.

Figure 2:
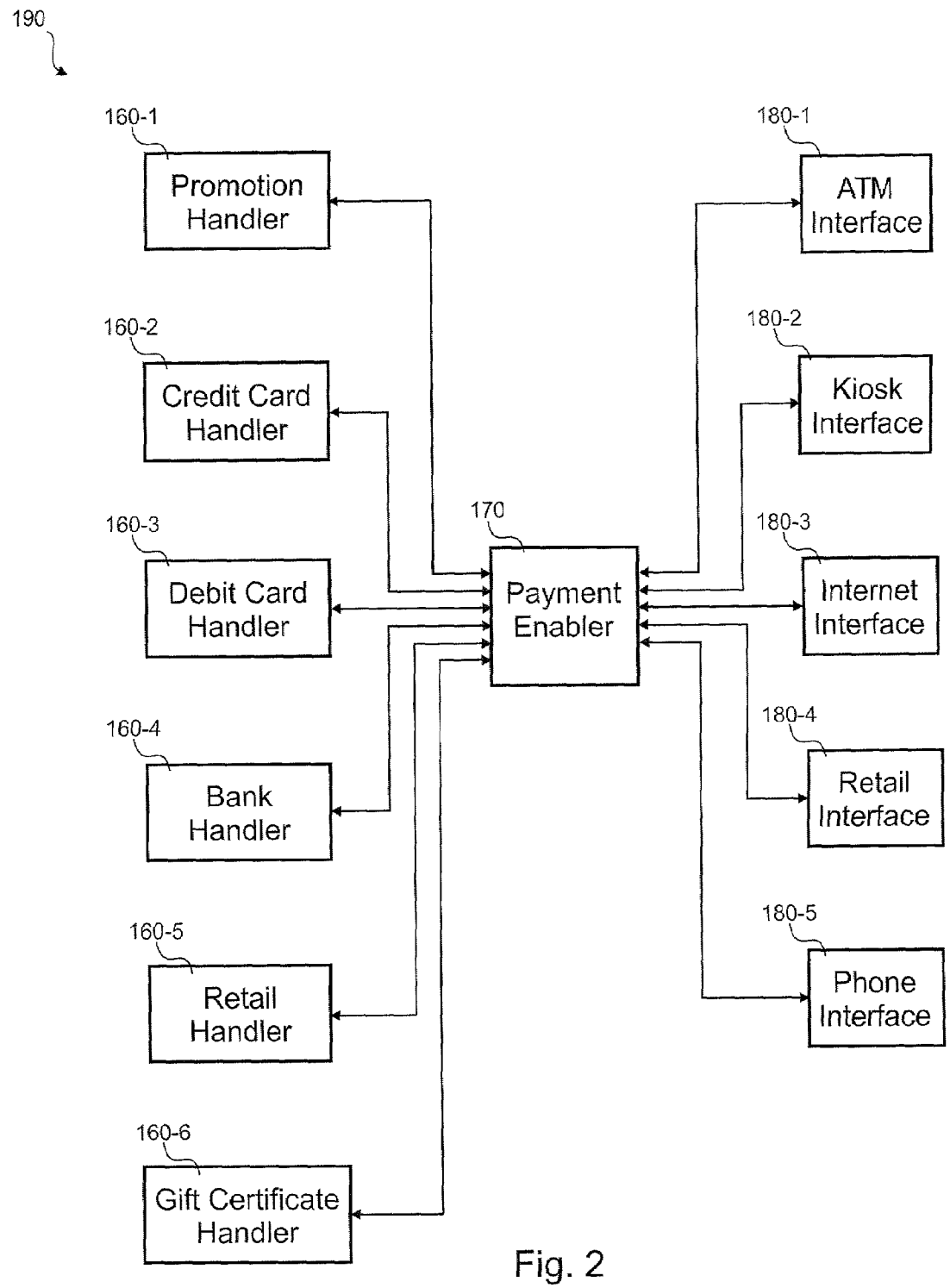
FIG. 2 is a block diagram of another embodiment of an online money transfer system.

With reference to FIG. 2, a block diagram of an embodiment of an online money transfer system 190 is shown. The money transfer system 190 can be used for a variety of purposes, such as sending checks, sending greeting cards, sending payments for goods or services, or other situations where the receiver 130 may not have a merchant account for accepting electronic payment. In this embodiment, six handlers 160 and five user interfaces 180 are shown. Other embodiments could have more or less handlers 160 and interfaces 180. Each of the handlers 160 allows a sender or receiver 110, 130 to add and/or remove money from the payment enabler 170. Normally, the receiver 130 can choose the handler 160, but in some circumstances, the sender 110 can choose the handler 160. For example, the sender may specify a particular gift certificate handler 160-6 that only allows the certificate to be used at a particular store for merchandise and/or services. The user interfaces 180 allow interaction with the payment enabler 170 to transfer money to and from a stored value fund.

The promotion handler 160-1 allows adding and removing money in a form other than legal tender or negotiable instrument. Examples include airline mileage programs, prepaid phone cards. For example, a user could use money in their stored value fund to purchase airline miles with an airline mileage handler 160-1. A conversion rate would be applied to convert the money to mileage credit. The promotion handler 160-1 may need special information from the payment enabler 170, such as the user's promotion account number, etc. Some of the interfaces 180 used to gain access to the payment enabler 170 could be used to also gain access to the vending site 140 to allow selecting a listing where a computer 120 may not be readily available to the sender 110.

The credit and debit card handlers 160-2, 160-3 behave largely the same. Both can be used to add money into the payment enabler 170. In other embodiments, these handlers 160-2, 160-3 can also be used to remove money from the payment enabler 170 also, for example, to purchase a prepaid credit/debit card, to pay down a balance on a credit card, or to add credit to a bank account associated with a debit card. To use these handlers 160-2, 160-3, the payment enabler 170 stores the information for receiving money from credit or debit cards in the conventional way, such as the account number, expiration date, name, and/or PIN. Similar information may be used when paying-out money to a credit/debit card.

The bank handler 160-4 allows electronic funds transfer (EFT) of money to a bank account of the user. The user enters the account number and routing information into the payment enabler 170 with a user interface 180 to facilitate adding and removing of money from the payment enabler with this handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as a retail interface 180-4 for interacting with the payment enabler 170. Some embodiments could wire money into a bank account of the user instead of an EFT.

The retail handler 160-5 typically corresponds to a retail location 500 or storefront that may wire money, print money orders and/or cash checks. Money may be sent to the retail handler 160-5, whereafter the user is issued cash or a negotiable instrument for that money. Money can be added to the system 100 by the retail handler 160-5 also. For example, the user may give cash to the clerk at the retail location 500 who enters a credit into the payment enabler. The user could further specify to the clerk a receiver who should get the money. A retail interface 180-4 at the retail location 500 or bricks and mortar location is used by the clerk to indicate to the payment enabler 170 that the money has been received from or by the user. Through an retail handler 160-5 a sender 110 could use the online money transfer system 100 without any knowledge of computers or without any debit/credit card or bank account.

Gift certificates are dispensed through one or more gift certificate handlers 160-6. The gift certificate can be limited to merchandise and/or services from a single store or a group of stores. In some cases, the gift certificate is used only online by entering a code provided to the receiver or could be printed for use in a bricks and mortar store. Cash equivalents such as FlooZ™, formerly available from Flooz.com, could also be provided to the receiver 130. For example, a listing on the vending site 140 may specify that the compensation should be in the form of a particular gift certificate.

As briefly discussed above, the ATM interface 180-1 allows interaction with the payment enabler 170. The user may 110, 130 or may not have an affiliation with the ATM that is used to interface with the payment enabler 170. Under this circumstance, the owner of the ATM may charge the user a fee for this service. The user 110, 130 can receive cash or deposit cash if the ATM is coupled to a bank handler 160-4. In any event, the ATM interface 180-1 can be used to interface with the payment enabler 170 in the same way a user 110, 130 may interact through a web browser and computer 120 with the payment enabler 170. If the ATM has a magnetic stripe or smart card reader, this could be used by to avoid entering credit or debit card information manually for the payment enabler 170.

A kiosk interface 180-2 allows a user to interact with the payment enabler 170, but typically does not allow adding or removing cash. The kiosk interface 180-2 may be a browser terminal available for general use. Some embodiments may include a check or money order printer for removing money from the system 100. The kiosk interface 180-2 could be in a retail location 500 and linked to the other systems in the retail location 500 such that a payout could be provided by other systems in the retail location 500.

An Internet interface 180-3 is typically implemented through a web browser. The browser downloads web pages from the payment enabler 170. This browser may reside on the computer 120 of the sender or receiver 110,130. Some embodiments could host the Internet interface on a portable device such as a wireless phone or personal digital assistant (PDA). The Internet interface 180-3 may also be used by the ATM, kiosk and retail interfaces 180-1, 180-2, 180-4 in whole or in part. The Internet interface 180-3 uses encryption for the link to the payment enabler 170 in some embodiments.

The retail interface 180-4 allows for specialized interaction by a clerk at the retail location 500. Clerks typically have special training and offer enhanced services over most interfaces 180 and handlers 160. The clerk can move money between senders 110 and receivers 130 at the direction of the user. Also, the clerk can pay-in and pay-out money from the transfer system 100 for any user. The retail interface 180-4 allows an clerk to act on behalf of the user when manipulating the user's account. For security, the user's password or PIN may be entered during this manipulation. Further, the clerk may verify the identity of the receiver 130 before disbursing the any money from the transfer system 190. In one embodiment, a test question is provided by the sender 110 that the receiver 130 must answer before the electronic gift is paid-out.

Interaction with the payment enabler 170 may also be performed over a telephone 140 interfaced to the plain-old telephone system (POTS) 155. The phone interface 180-5 provides voice prompts and recognizes the user's touch-tone or speech recognized input. Enhanced interaction with the phone interface 180-5 could be provided with wireless phones having wireless access protocol (WAP) and/or browser graphical user interfaces (GUIs).

Figure 3:
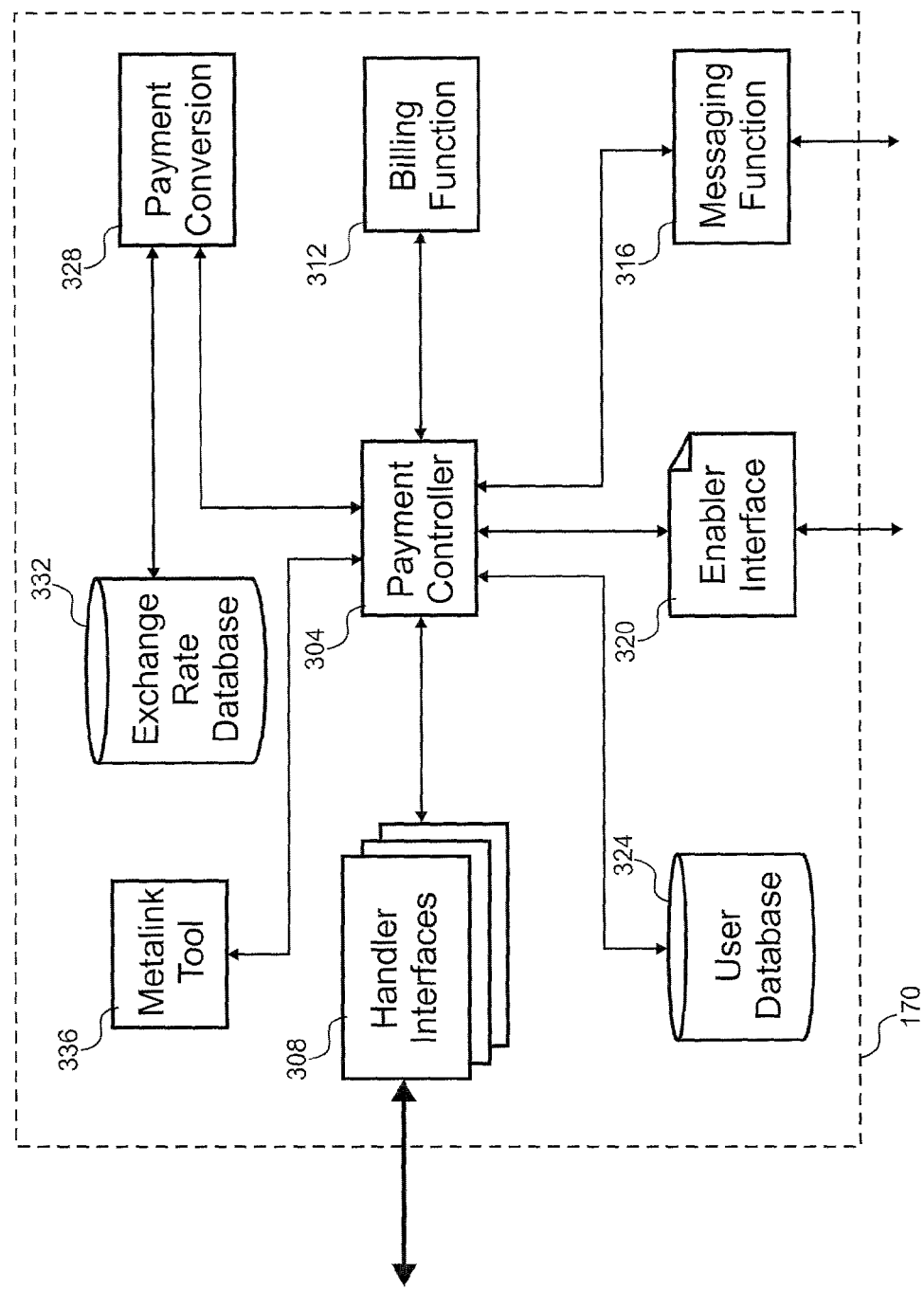
FIG. 3 is a block diagram of an embodiment of a payment enabler.

Referring to FIG. 3, a block diagram of an embodiment of a payment enabler 170 is shown. The transfer of money between handlers 160, stored value funds and users 110, 130 is controlled by the payment enabler 170. The payment enabler 170 may be implemented on one or more computers in one or more locations where the various computers communicate over a network. Included in the payment enabler 170 are a payment controller 304, handler interfaces 308, a billing function 312, a messaging function 316, an enabler interface 320, a user database 324, a payment conversion function 328, an exchange rate database 332, and a metalink tool 336.

The payment controller 304 manages operation of the payment enabler 170. The handlers 160 and interfaces 180 along with user information and money conversion tasks are all choreographed by the payment controller 304. The payment controller 304 is interconnected to the other portions of the payment enabler 170 by one or more networks.

The payment conversion function 328 allows converting between disparate forms of money as it is transferred through the transfer system 190. An exchange rate database 332 holds conversion factors that allow determining the proper weight to give one form of money with respect to the others. In one example, the payment conversion function 328 may convert money in U.S. dollars to money in European Union Euros. In another example, a user may convert money into airline miles at the rate of eight miles for every dollar for a promotion handler 160-1. The exchange rate database 332 is updated with conversion rates as often as practical using conventional methods. The conversion rate may accommodate a percentage service fee for the exchange, or instead of a conversion rate, a flat fee could be charged.

A billing function 312 monitors and charges for the services of the payment enabler 170. There may be charges when transferring money, converting money, sending electronic gifts, printing and mailing negotiable instruments, using kiosks, ATMs or retail locations, inserting snippets into listings on vending sites 140, etc. These charges are normally deducted from a transfer, but other embodiments could charge monthly fees or use based fees. Some embodiments could recover a fee from the handler 160. For example, a fee could be charged to the gift certificate target store instead of charging the sender 110. The different types of handlers 160 may have different fees associated with them. For example, a credit card may have a three percent charge, but a bank transfer may only have a one percent charge. The sender and/or the receiver can be charged to transfer money between themselves. Further, a charge from the money transfer could be funneled back to the vending site 140 to pay for the listing. The transfer in or out of the system 100 may incur a separate charge. The billing function 312 may issue invoices for some users.

There are handler interfaces 308 to support the various handlers 160. Each of these interfaces 308 may support a single handler 160 or a group of handlers. For example, a single interface may perform EFT both to and from all bank handlers 160. When money is sent to or received from a handler 160, the appropriate handler interface 308 passes the money and transfer information to the payment controller. In some embodiments, the cost of the transfer to or from the handler is reported by the handler interface 308 such that the billing function could recover those costs as a fee to the buyer 110 or seller 130.

Information for the users of the system 100 is stored in the user database 324. This information includes an address book of other users, money credit in the stored value fund, past money transfer information, account number, e-mail addresses, contact information, vending site login information, snippet information and preferences, customized snippet messages, handler interface information, handler preference information, etc. The money credit is stored in a trust account for the benefit of the user according to the entry in the user database 324 corresponding to that user and interest may or may not be paid on that money credit.

Money is a credit amount stored as a database entry corresponding to the user in the user database 324. The database entry corresponds to a stored value fund for that user that can be supplemented by transferring-in credit or reduced by transferring-out credit. The money or credit is transferred between users by updating the database entries for the users involved in the transfer. Money could be in any currency or be anything of monetary value, for example, airline mileage, promotional program points, gift certificate credit, commodities such as gold, etc.

Some embodiments may not used stored value funds. In these embodiments, money transfers to the receiver 130 pass directly to the money handler 160 specified by the receiver 130. The receiver has the option of having the money transfer once it clears or immediately. Where the transfer is immediate, transfers that fail could be absorbed by either the receiver 130 or the payment enabler 170 if insurance is purchased.

The enabler interface 320 is used by the various interfaces 180 to interact with the user. The enabler interface 320 produces the form web pages and informational web pages to allow the user to create and maintain their account, transfer money, select electronic gifts, configure vending site snippets, and learn to use the system 100. The appropriate user interface 180 formats and processes the enabler interface information according to the device used to interface with the payment enabler 170. For example, the Internet interface 180-3 takes the information from the enabler interface 320 and formats into hypertext mark-up language (HTML) appropriate for the computer 120 of the user.

A messaging function 316 is used with some configurations to notify the user of certain events. Requests for money are sent by the messaging function 316 along with acknowledgment and billing messages. These messages could be accessed using a web browser, an e-mail program, an instant messaging program, a pager, a WAP enabled device, etc. In some embodiments, the messaging function 316 may issue printed bills for users. The messaging function 316 is also used to communicate with retail locations 500 and with the eCard site 140. Some embodiments use the metalink tool 336 to formulate a money request to the buyer 110 after a listing matures at the vending site.

The metalink tool 336 manages formulation of snippets, automated insertion of those snippets at the vending site, gathering information about the listing, and formulating money requests for a listing. Electronic listings, such as classified ads and auctions, are managed by the metalink tool 336 for the benefit of a seller 130. Goods or services offered in a listing can be paid for using the payment enabler 170.

The metalink tool 336 gathers information on each listing from the seller 130, the vending site 140, the buyer 110, and any information stored in the user database 324 in the past. Information gathered and stored in the user database 324 for each listing could include a shipper selection, shipping insurance cost information, an address for the seller, tax information, an item description, a reference number, a payment enabler category, a purchase price, a phone number for the seller, a close date for the listing, and a quantity of items in the listing. After the listing closes, information such as the address of the buyer, the e-mail address of the buyer, the shipping selection, the insurance selection, a purchase order number, special handling instructions, and other information could be added to the user database 324.

In a listing, the seller 130 often whishes to indicate the forms of payment accepted. A branded graphic or button can accomplish this. By way of the enabler interface 320, the seller 130 interacts with the metalink tool 336 to insert a snippet of HTML code that references a graphic for display. This graphic can be made into a button by including a link or a universal resource identifier (URI) that is loaded into the browser when the graphic is clicked upon. The metalink tool 336 stores login information for any number of vending sites associated with each seller 130 in the user database 324. The login information allows the metalink tool 336 to automatically insert the snippet into the current listings of the seller 130 and/or all future listings of the seller 130. Some embodiments just list the HTML code of the snippet in a web page that the seller 130 can cut and paste into a listing. In some cases, the snippet may include a custom message from the seller 130 that is either visible all the time or only when the cursor hovers over the graphic.

The link can include information about the listing to make the process of sending money to the seller 130 easier. In one embodiment, a code unique to that listing is inserted into the link. That code is used to query the user database 324 for information on the listing. Another embodiment includes fields in the link that hold some or all of the information relevant to the listing.

Here is an example of a snippet that might be automatically inserted or manually pasted into a listing: <form name="frmMZSubmit" method="POST" action="http://fdcdevwev1/HSPaymeSignon.asp"><input type="hidden" name="hdnMZUserID" value="3181"><input type="hidden" name="hdnAmount" value="34"><input type="hidden" name="hdnSubject" value="ParkieBaby"><input type="hidden" name="hdnReferenceNumber" value="223453389"><tr><td colspan="2" align="center"><input type="impage" name="imgSubmit" src="http://www.moneyzap.com/images/logo_1g.gif"></td></tr></form>. Specified in this snippet are the payment enabler user identifier for the seller 130, the purchase price of $34, the subject of the listing of "ParkieBaby," the reference number for the listing of "223453389," a link back to the payment enabler 170, and a graphic for the button. Although this embodiment uses HTML and scripts, any combination of web languages could be used such as ActiveX™, Java™, scripting languages, etc. Other embodiments could embed more information in the link that is provided to the payment enabler 170 when the link is presented as is known in the art.

The metalink tool 336 can track the listing to determine when it has matured for sale. For example, an auction may have a closing date while a classified ad is mature so long as the item is not sold. When a listing matures, the metalink tool automatically gathers the sale price, the buyer 110, the e-mail address of the buyer, the shipping amount, a listing description, a reference identifier used by the vending site, and any other information available from the vending site 140. Some embodiments automatically compose a message with an embedded snippet that is sent to the buyer 130 soliciting money from the payment enabler. The seller can customize the contents of this message in one embodiment.

Figure 4:
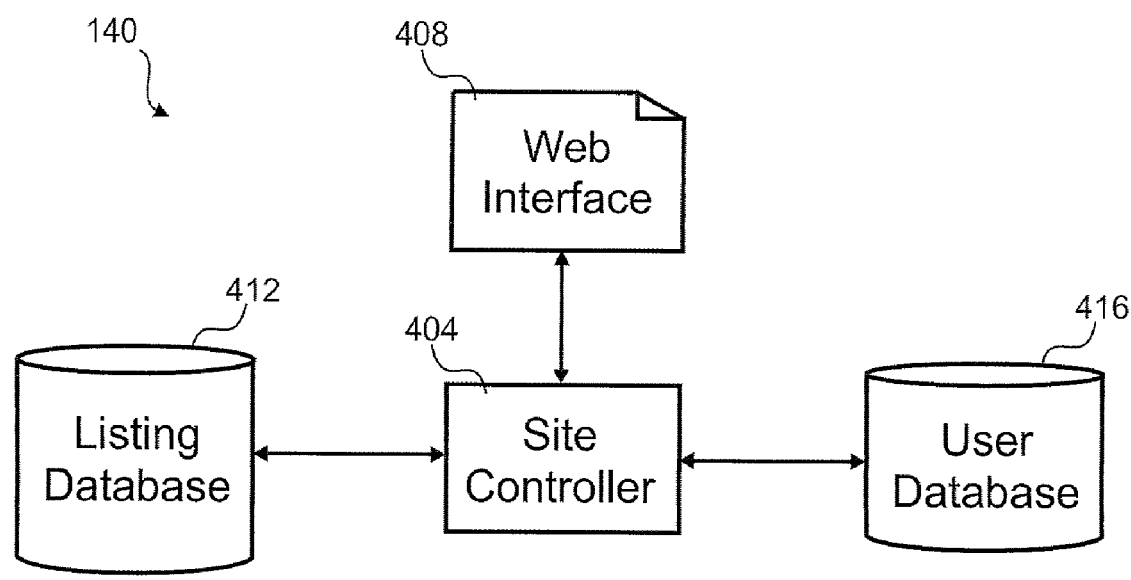
FIG. 4 is a block diagram of an embodiment of a vending site.

With reference to FIG. 4, a block diagram of an embodiment of a vending site 140 is shown. The vending site 140 works in concert with the money transfer system 190 to allow paying the seller for whatever is offered in the listing at the vending site 140. The vending site includes a site controller 404, a web interface 408, a user database 416, and a listing database 412.

The site controller 404 manages the functions of the vending site 140. The web interface 408 allows interaction with information in the listing database 412 and user database 416. Both the sender and receiver 110, 130 interact with the web interface 408 to browse listings or enter listings. Any account information on the sender and receiver 110, 130 is stored in the user database 416. The listing database 416 stores the listings of the sellers 130.

The site controller 404 allows adding information to listings, determining contact information for a buyer, and searching for listings of a particular seller. These functions are typically meant for manual interaction through the web interface 408. The metalink tool uses these functions in an automated way to extract the information relating to transferring money. In some embodiments, the vending site 140 may have special interfaces designed for automated interaction with software robots gathering information.

Figure 5:
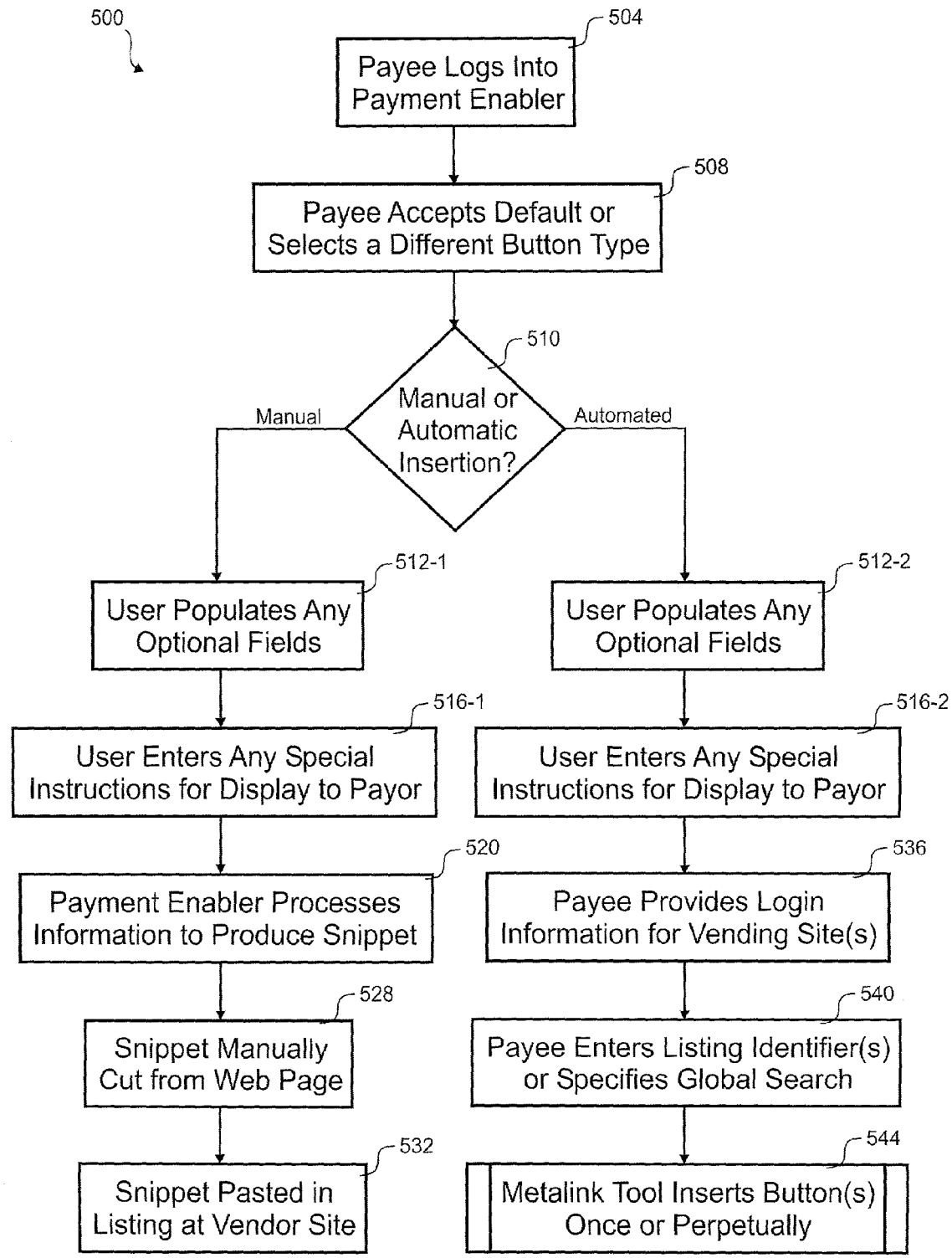
FIG. 5 is a flow diagram of an embodiment of a process for adding snippets to listings on the vending site.

Referring next to FIG. 5, a flow diagram of an embodiment of a process 500 for adding snippets to listings on the vending site is shown. The depicted portion of the process begins in step 504 where the seller 130 logs into the payment enabler 170 with a user interface 180. In step 508, a graphic is chosen that will act as a button when coupled with a link. A determination is made in step 510 as to whether the snippet will be manually or automatically inserted in listings. In this embodiment, manual insertion is done one listing at a time, but automatic insertion is done for all listings. In automatic mode, some embodiments could query the vending systems to present a column of listings that the seller 130 could select individual listings to receive the snippet.

Where a single snippet for manual insertion is selected in step 510, processing continues to step 512-1 where a web page is presented to the seller 130 for entry of information that is associated with the listing. These fields could include specification of shipping options, shipping insurance cost information, an address for the seller, tax information, an item description, a reference number, a payment enabler category, a purchase price, a phone number for the seller, a close date for the listing, and a quantity of items in the listing. Some fields, such as the purchase price may be left blank. In step 516-1, the seller 130 can enter a special message that is presented beneath the snippet or as the cursor passes over the graphic. For example, this message could say "Multiple Items Shipped at No Extra Cost" or some other message.

In step 520, the information is processed to produce a snippet. The snippet includes fields that will be used when presenting the details of the transaction to the buyer 110 for approval. The snippet is manually cut from the web page of the payment enabler 170 for pasting into the vending site in steps 528 and 532. In some cases, the seller 130 may modify the fields in the snippet. Whatever ends up in those fields is presented to the buyer in a pre-populated money transfer window when the purchase process begins.

Referring back to step 510 and the case where automatic insertion is selected, processing proceeds to step 512-2 where a potentially different set of optional fields are presented to the seller 130. With automatic snippet insertion, there are potentially many listings that are updated so fields unique to a particular listing are not entered in step 512-2. Information that is entered includes specification of shipping options, shipping insurance cost information, an address for the seller, tax information, and a phone number for the seller. Some of these fields may be pre-populated with information from the user database 324, which would allow modification by the seller 130. Most of the remaining information can be mined from the vending site 140 by the metalink tool 336. Any special instructions are entered in step 516-2. These instructions are visible in all the listings where snippets are inserted.

In step 536, login information is provided to the metalink tool 336 for all the vending sites 140 that have listings needing snippets. This login information is stored in the user database 324 for next time. They seller can enter individual listings by their identifier for each vending site 140 or can specify a global insertion for all listings associated with the login information in step 540. Some embodiments search the vending sites 140 for listings and present a web page that shows the listings and allows selection of individual listings, all listings on a particular vending site or all listings on all vending sites. In step 544, the metalink tool 336 inserts buttons into the listings specified in step 540.

Figure 6:
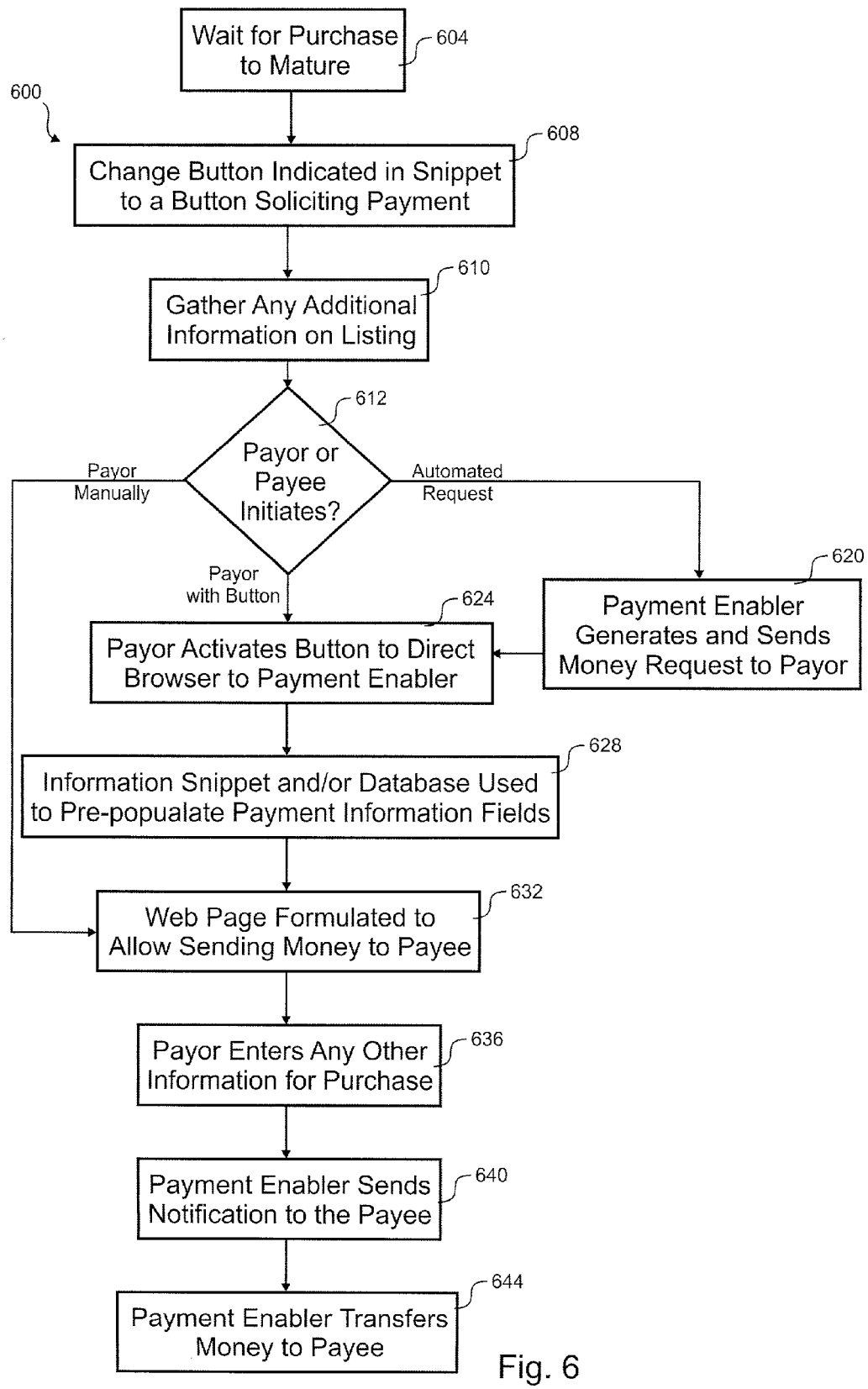
FIG. 6 is a flow diagram of an embodiment of a process for a buyer paying for goods and/or services in the listing.

With reference to FIG. 6, a flow diagram of an embodiment of a process 600 for a buyer 110 paying for goods and/or services in the listing is shown. The depicted portion of the process begins in step 604 where the listing matures. With classified advertisements, the listing matures once it appears on the vending site 140. But with most auctions, the buyer is not determined until the close of the auction period at which time the listing matures. In some embodiments, a classified advertisement can become stale when the listing is already sold or after some time period. In those circumstances, the metalink tool 336 could change the graphic to indicate unavailability or could contact the vending site 140 to remove the listing.

Once the listing has matured, the graphic for the button reflects in step 608 that payment can be made now to purchase the goods and/or services in the listing. In step 610, the metalink tool 336 gathers information about the closed listing such as final price, buyer user identifier, buyer e-mail address, etc. for storage in the user database 324. If the buyer user identifier for that vending site 140 is found in the user database, additional information can be determined for the transaction. There are three options for proceeding with payment from step 612, namely, the payor manually goes to the payment enabler, the payor uses the button to go to the payment enabler, or the payee sends a money request to the payee.

Where an automated request from the buyer 110 for money is prepared, processing continues from step 612 to step 620 where a money request message is sent to the buyer 110. In this embodiment, an e-mail message is formulated and sent, but other embodiments could use a message on a web page, an instant message, a pager message, a wireless phone message, or other electronic message to request the money. The message includes a link to the payment enabler in a snippet. The snippet has embedded information relating to the transaction, such as a shipper selection, shipping insurance cost information, an address for the seller, tax information, an item description, a reference number, a vending site identifier, a payment enabler category, a purchase price, a phone number for the seller, a close date for the listing, a quantity of items in the listing, a buyer user identifier, a buyer e-mail address, a buyer address, and/or an account number of the buyer for the payment enabler. Alternative embodiments may instead include a code that references the transaction information stored in the user database 324 such that in either case it is available to pre-populate forms for sending money.

In most cases, the payor activates the link in the snippet to direct their web browser to the payment enabler 170 and to reference transaction information. In some cases, however, the payor 110 will manually point their browser to the payment enabler 170 without the benefit of the information embedded in the snippet. In step 628, the information from the snippet and/or user database is used to pre-populate information fields for the money transfer. Things that typically are used in a person-to-person money transfer include information on the seller, on the transaction and on the buyer. Certain information available may be shielded from the buyer 110 or seller 130 to protect privacy.

In step 632, a web page is formulated to allow the authorization of sending money to the payee. All fields are populated with any gathered information, but some fields may be modifiable, such as the shipping information, money handler information, insurance for the shipping, the quantity, any special instructions to the seller, etc. Any fields that are missing information are populated by the buyer 110 in step 636. Some non-essential fields may be left blank by the buyer 110. In step 640, electronic notification is sent to the seller that payment has been received. The payment is transferred in step 644 from the money handler of the buyer to the stored value account of the seller.

As mentioned above, it is possible for the buyer to manually browse to the payment enabler 170 without using the link in the snippet by proceeding from step 612 directly to step 632. Under this circumstance, the payment enabler does not know the listing being paid for. In one embodiment, the buyer sends money to the seller in the traditional way. In another embodiment, the buyer enters a vending site and listing identifier so that information stored in the user database 324 is used to pre-populate forms. In any event, processing continues through steps 632, 636, 640 and 644 as with the embodiment where a money request is sent to the buyer discussed above.

A third alternative from step 612 involves the buyer activating the button in the snippet on the vending site 140. After maturing, the button in the listing can be activated in step 624 as in the money request embodiment discussed above. From step 624 and beyond processing proceeds as in that money request embodiment.

Figure 7:
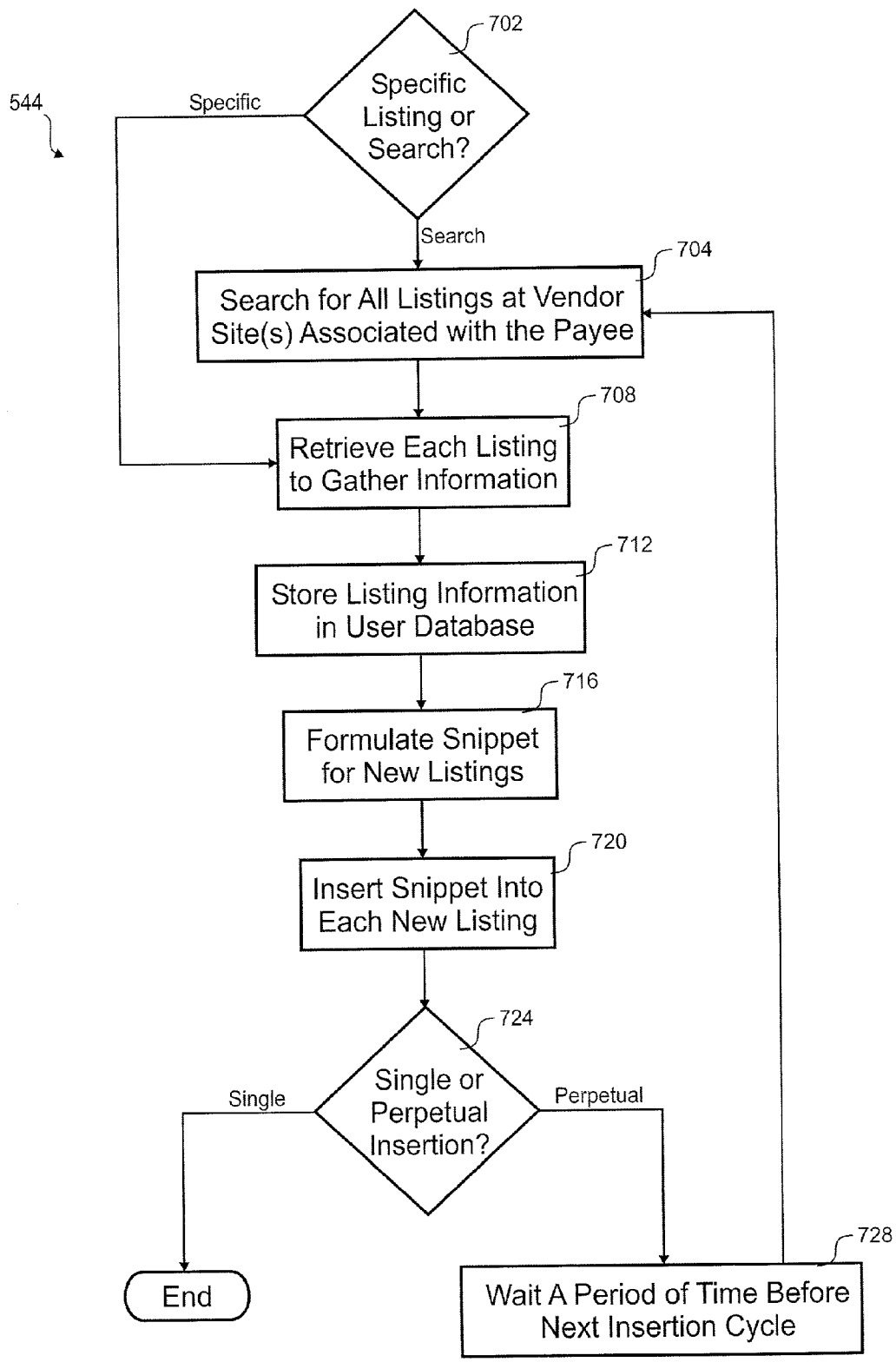
FIG. 7 is a flow diagram of an embodiment of a process for automatically inserting snippets in listings.

Referring next to FIG. 7, a flow diagram of an embodiment 544 of a subroutine for automatically inserting snippets in listings is shown. In this embodiment, the seller 130 has chosen automatic insertion of snippets for specific listings or all listings on a one-time basis or for all listings going forward. In step 702, a determination as to whether there are only specified listing(s) or a search for listings should be done. If a search is specified, it is performed in step 704. That search can be performed on one or more vending sites 140.

Regardless of how the listings are found, information is gathered in step 708 about those listings. Information such as the type of listing, any closing date, the subject of the listing, the quantity, and any other information is gathered. The gathered information is stored in the user database 324 in step 712. For each listing found, a customized snippet is formulated in step 716. Those snippets are inserted in their respective listings in step 720. If a one-time insertion is requested, processing from step 724 ends until another request is made by the seller 130. If the seller specifies perpetual insertion, processing goes from step 724 to step 728 to wait for the next insertion cycle. In this embodiment, the insertion process is run once a day to look for and insert snippets in new listings. Other embodiments may use other periods or could have the period be specified by the seller 130.

While the principles of the invention have been described above in connection with specific apparatuses and methods, it is to be clearly understood that this description is made only by way of example and not as limitation on the scope of the invention.

What is claimed is:

1. A method for facilitating payment between a buyer and a seller with an online money transfer performed over a wide area network, the method comprising steps of:
    receiving login information relevant to a vending site, wherein the login information is associated with the seller, wherein the vending site facilitates person-to-person sales, wherein the vending site is one of an auction site or a classified advertising site;
    in response to receiving the login information, automatically determining listings at the vending site associated with the seller based on the login information, wherein the listings offer goods or services for sale, wherein the listings are one of auctions, electronic advertisements, or classified advertisements;
    generating a plurality of snippets of HTML code for the listings, wherein each snippet includes a link, wherein the snippets include information about the listing;
    automatically inserting one of the plurality of snippets into each of the listings;
    determining the listing has changed;
    in response to determining the listing has changed, changing a graphic indicated by the snippet to alert the buyer that payment can be made; and
    in response to changing the graphic, providing a link in the snippet with the changed graphic, wherein activating the link points a web browser to a payment enabler that can transfer money from the buyer to the seller, wherein the vending site is separate from the payment enabler.

2. The method for facilitating payment between the buyer and the seller with the online money transfer performed over the wide area network as recited in claim 1, wherein one of the plurality of snippets indicates a graphic associated with the snippet and information unique to the seller and a listing including the snippet.

3. The method for facilitating payment between the buyer and the seller with the online money transfer performed over the wide area network as recited in claim 1, wherein:
    the determining step comprises a step of concluding the listing has matured, whereby the purchaser is fixed; and
    the changing step comprises a step of modifying a button graphic displayed by the snippet to reflect the listing is available to the buyer.

4. The method for facilitating payment between the buyer and the seller with the online money transfer performed over the wide area network as recited in claim 1, further comprising steps of:
    determining one of the plurality of listings has matured, whereby the buyer is fixed;
    automatically determining an electronic address of the purchaser; and
    automatically sending a message to the electronic address of the purchaser.

5. The method for facilitating payment between the buyer and the seller with the online money transfer performed over the wide area network as recited in claim 4, wherein the message includes at least one of a web page, an instant message, an e-mail message, a pager message, or a wireless phone message.

6. The method for facilitating payment between the buyer and the seller with the online money transfer performed over the wide area network as recited in claim 4, further comprising a step of automatically determining a purchase price from the vending site.

7. The method for facilitating payment between the buyer and the seller with the online money transfer performed over the wide area network as recited in claim 4, wherein the message includes a snippet that points to the payment enabler and includes information relating to a listing associated with that snippet.

8. The method for facilitating payment between the buyer and the seller with the online money transfer performed over the wide area network as recited in claim 1, further comprising a step of determining from the vending site at least one of: a purchase price, a shipping amount, a listing description, a reference identifier used by the vending site, or an e-mail address of the buyer.

9. The method for facilitating payment between the buyer and the seller with the online money transfer performed over the wide area network as recited in claim 1, further comprising a step of receiving selection of a button graphic for display by the snippet.

10. The method for facilitating payment between the buyer and the seller with the online money transfer performed over the wide area network as recited in claim 1, further comprising steps of:
    receiving authorization from the buyer to debit a money handler associated with the buyer; and
    adding a credit in a stored value account of the seller as a result of the receiving authorization step.

11. The method for facilitating payment between the buyer and the seller with the online money transfer performed over the wide area network as recited in claim 1, further comprising a step of receiving at least two of a shipper selection, shipping insurance cost information, an address for the seller, tax information, an item description, a reference number, a payment enabler category, a purchase price, a phone number for the seller, a close date for the listing, or a quantity of items in the listing.

12. The method for facilitating payment between the buyer and the seller with the online money transfer performed over the wide area network as recited in claim 1, further comprising a step of receiving from the seller a message that is embedded in the plurality of snippets for display as part of each listing.

13. The method for facilitating payment between the buyer and the seller with the online money transfer performed over the wide area network as recited in claim 1, further comprising a step of receiving login information relevant to a plurality of vending sites, wherein the login information for each of the plurality of vending sites is associated with the seller.

14. A method for facilitating payment between a buyer and a seller with an online money transfer performed over a computer network, the method comprising steps of:
    receiving login information relevant to a vending site, wherein the login information is associated with the seller, wherein the vending site facilitates person-to-person sales, wherein the vending site is one of an auction site or a classified advertising site;
    in response to receiving the login information, determining a listing at the vending site associated with the seller based on the login information, wherein the listings offer goods or services for sale, wherein the listings are one of auctions, electronic advertisements, or classified advertisements;

generating a snippet of code for the listing, wherein:

the snippet includes a link that addresses a payment enabler, wherein the vending site is separate from the payment enabler;

the snippet indicates information unique to the seller and the listing including the snippet, wherein the snippets include information about the listing;

determining the listing has matured, whereby the buyer is fixed;

in response to determining the listing has changed, determining an electronic address of the buyer; and automatically sending a message to the electronic address of the buyer.

15. The method for facilitating payment between the buyer and the seller with the online money transfer performed over the computer network as recited in claim 14, further comprising a step of automatically inserting the snippet into the listings.

16. The method for facilitating payment between the buyer and the seller with the online money transfer performed over the computer network as recited in claim 14, wherein the snippet indicates a graphic associated with the snippet.

17. The method for facilitating payment between the buyer and the seller with the online money transfer performed over the computer network as recited in claim 14, wherein the message includes at least one of a web page, an instant message, an e-mail message, a pager message, or a wireless phone message.

18. The method for facilitating payment between the buyer and the seller with the online money transfer performed over the computer network as recited in claim 14, further comprising a step of automatically determining a purchase price from the vending site.

19. The method for facilitating payment between the buyer and the seller with the online money transfer performed over the computer network as recited in claim 14, wherein the message includes the link that points to the payment enabler and includes information relating to the listing.

20. The method for facilitating payment between the buyer and the seller with the online money transfer performed over the computer network as recited in claim 14, further comprising steps of:

receiving authorization from the buyer to debit a money handler associated with the buyer; and adding a credit in a stored value account of the seller as a result of the receiving authorization step.

21. The method for facilitating payment between the buyer and the seller with the online money transfer performed over the computer network as recited in claim 14, further comprising a step of receiving from the seller a unique message that is embedded in the plurality of snippets for display as part of each listing.

22. A method for facilitating payment between a buyer and a seller with an online money transfer performed over a computer network, the method comprising steps of:

receiving login information relevant to a vending site, wherein the login information is associated with the seller, wherein the vending site facilitates person-to-person sales, wherein the vending site is one of an auction site or a classified advertising site;

in response to receiving the login information, determining a listing at the vending site associated with the seller based on the login information, wherein the listings offer goods or services for sale, wherein the listings are one of auctions, electronic advertisements, or classified advertisements;

generating a snippet of code for the listing;

inserting the snippet into the listing;

determining the listing has matured, whereby the buyer is fixed;

in response to determining the listing has matured, automatically determining an electronic address of the buyer; and automatically sending a message to the electronic address of the buyer, wherein the message includes the snippet, wherein the snippet comprises: a link that points to a payment enabler, and a message formulated by the seller for display to the buyer, wherein the vending site is separate from the payment enabler.

23. The method for facilitating payment between the buyer and the seller with the online money transfer performed over the computer network as recited in claim 22, further comprising a step of automatically determining a purchase price from the vending site.

24. The method for facilitating payment between the buyer and the seller with the online money transfer performed over the computer network as recited in claim 22, further comprising a step of determining from the vending site at least one of: a purchase price, a shipping amount, a listing description, a reference identifier used by the vending site, or an e-mail address of the buyer.

25. The method for facilitating payment between the buyer and the seller with the online money transfer performed over the computer network as recited in claim 22, further comprising steps of:

receiving authorization from the buyer to debit a money handler associated with the buyer; and adding a credit in a stored value account of the buyer as a result of the receiving authorization step.

26. The method for facilitating payment between the buyer and the seller with the online money transfer performed over the computer network as recited in claim 22, wherein the snippet further indicates an information unique to the seller and the listing including the snippet.

* * * * *

UNITED STATES PATENT AND TRADEMARK OFFICE
CERTIFICATE OF CORRECTION

PATENT NO.       : 7,596,529 B2
APPLICATION NO.  : 10/076036
DATED            : September 29, 2009
INVENTOR(S)      : Mascavage, III et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1907 days.

Signed and Sealed this

Twenty-eighth Day of September, 2010

David J. Kappos
*Director of the United States Patent and Trademark Office*